US006223605B1

(12) United States Patent
Koudal et al.

(10) Patent No.: US 6,223,605 B1
(45) Date of Patent: May 1, 2001

(54) CORIOLIS-TYPE MASS FLOW SENSOR WITH A SINGLE MEASURING TUBE

(75) Inventors: Ole Koudal, Reinach; Alfred Wenger, Neftenbach, both of (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 09/039,718

(22) Filed: Mar. 16, 1998

Related U.S. Application Data

(60) Provisional application No. 60/050,722, filed on Jun. 25, 1997.

(30) Foreign Application Priority Data

Apr. 10, 1997 (EP) .................................................. 97810211

(51) Int. Cl.$^7$ ....................................................... G01F 1/84
(52) U.S. Cl. .................................. 73/861.357; 73/861.354
(58) Field of Search ....................... 73/861.355, 861.356, 73/861.357

(56) References Cited

U.S. PATENT DOCUMENTS

| | | |
|---|---|---|
| 3,132,512 | 5/1964 | Roth . |
| 4,895,031 * | 1/1990 | Cage ................................. 73/861.335 |
| 5,307,689 | 5/1994 | Nishiyama et al. . |
| 5,365,794 | 11/1994 | Hussain et al. . |
| 5,476,013 | 12/1995 | Hussain et al. . |
| 5,531,126 * | 7/1996 | Drahm ............................. 73/861.356 |
| 5,549,009 | 8/1996 | Zaschel . |
| 5,705,754 | 1/1998 | Keita et al. . |
| 5,804,742 * | 9/1998 | Rademacher-Dubbick .... 73/861.357 |
| 5,854,430 * | 12/1998 | Drahm et al. ................... 73/861.357 |
| 5,969,265 * | 10/1999 | VanCleve et al. .............. 73/861.357 |

FOREIGN PATENT DOCUMENTS

| | | |
|---|---|---|
| 3824351 | 1/1990 | (DE) . |
| 0 473 919 | 3/1992 | (EP) . |
| 0 687 893 | 7/1992 | (EP) . |
| 0 770 858 | 6/1996 | (EP) . |
| 1316083 | 2/1962 | (FR) . |
| 2 290 661 | 11/1974 | (FR) . |

* cited by examiner

Primary Examiner—Harshad Patel
(74) Attorney, Agent, or Firm—Bose McKinney & Evans LLP

(57) ABSTRACT

A Coriolis-type mass flow sensor (1) is disclosed which is as insusceptible to external disturbances as possible and which can be installed in a conduit and, during operation, is traversed by a fluid to be measured. The conduit is connected via a fluid inlet (113) and a fluid outlet (114) with a casing (11) in which a rigid support base (12) is disposed. The support base (12) is connected with the casing via at least one mechanical damping element (13, 14, 20). A measuring tube (15) traversed by the fluid ends in the fluid inlet and the fluid outlet. A portion (151) of the measuring tube which is to be set into vibration is attached to the support base by an inlet-side fixing means (121) and an outlet-side fixing means (122). An inlet-side connecting portion (152) of the measuring tube extends from the inlet-side fixing means (121) to the fluid inlet (113), and an outlet-side connecting portion (153) extends from the outlet-side fixing means (122) to the fluid outlet (114). A vibrator assembly (16) for vibrating the tube portion (151) acts between the casing (11) and the support base (12). Two vibration sensing elements (17, 18) mounted partly on the tube portion (151) are disposed near the inlet-side fixing means (121) and near the outlet-side fixing means (122), respectively.

18 Claims, 2 Drawing Sheets

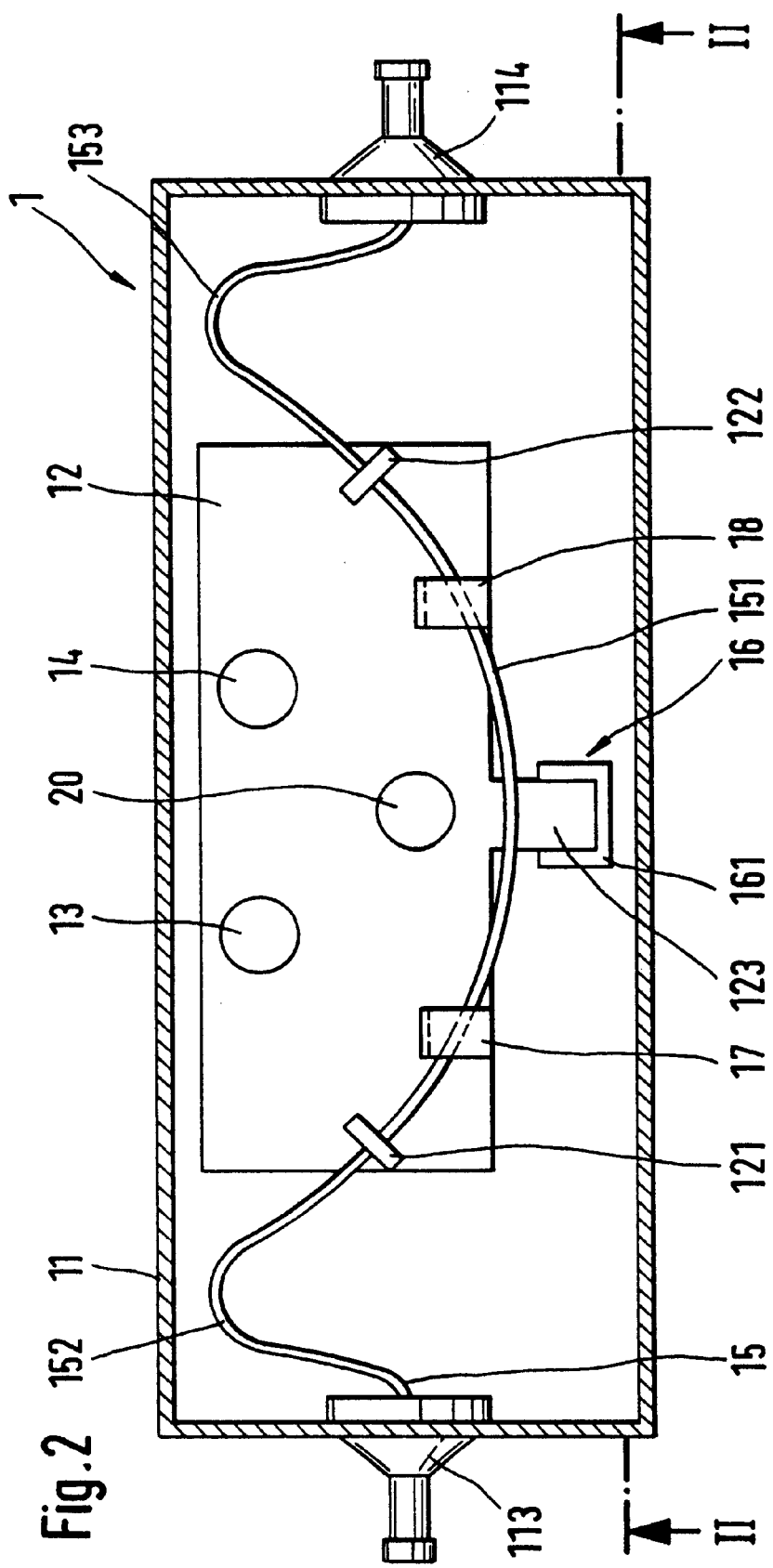

CORIOLIS-TYPE MASS FLOW SENSOR WITH A SINGLE MEASURING TUBE

This application claims benefit of Provisional application No. 60/050,722, filed Jun. 25, 1997.

FIELD OF THE INVENTION

The present invention relates to a Coriolis-type mass flow sensor with a single measuring tube.

BACKGROUND OF TIE INVENTION

As is well known, mass flow sensors are suitable for measuring the mass flow rate and/or the density of fluids flowing in a conduit in which the mass flow sensor is installed.

Coriolis-type mass flow sensors with at least two measuring tubes can be better made immune to disturbances originating from the conduit, such as vibrations of the conduit or wide pressure variations of the fluid, than Coriolis-type mass flow sensors having only a single measuring tube, which are also more sensitive to other disturbances acting on them, such as impacts on the casing.

These disturbances also include vibration components which are transmitted from the measuring tube vibrating at an instantaneous frequency to the conduit and are reflected from discontinuities in the conduit, thus traveling back to the measuring tube. These vibration components are particularly disturbing because they have the same instantaneous frequency as the measuring tube. Therefore, these disturbances cannot be eliminated by electronic means and are difficult to eliminate by mechanical means.

U.S. Pat. No. 5,307,689 describes two variants of Coriolis-type mass flowmeters whereby an attempt is made to eliminate the above-mentioned conduit-induced disturbances by circuit means, but the components having the same frequency as the vibration of the measuring tube cannot be eliminated. The design of the Coriolis-type mass flow sensor do not show any measures to suppress disturbances.

DE-A 38 24 351 describes a Coriolis-type mass flow sensor in which the rigid connection between two measuring tubes and a casing, which is stiff against vibration, is claimed to keep the above-mentioned external disturbances away from the two measuring tubes. It has turned out, however, that sufficient suppression of external disturbances cannot be achieved in this manner.

U.S. Pat. No. 5,705,754 describes a Coriolis-type mass flow sensor which can be installed in a conduit and which during operation is traversed by a fluid to be measured, comprising:

a casing to be connected with the conduit via a fluid inlet and a fluid outlet;

a support base disposed within the casing,
    said support base being connected to the casing via at least one mechanical damping element
        which is located on a nodal line of vibration of the support base;

a single measuring tube, traversed by the fluid, which is bent in a plane parallel to a top side of the support base and ends in a fluid inlet and a fluid outlet,
    a portion of said measuring tube to be vibrated in a direction perpendicular to said plane being fixed to the support base by a first fixing means provided in the area of a first edge of the support base and by a second fixing means provided in the area of a second edge of the support base, and
    a first connecting portion of said measuring tube extending from the first fixing means to the fluid inlet, and a second connecting portion extending from the second fixing means to the fluid outlet;

a vibrator for producing the vibrations; and a first sensing element mounted near the first fixing means for sensing the vibrations of the tube portion as well as a second sensing element mounted near the second fixing means for sensing the vibrations of the tube portion.

SUMMARY OF THE INVENTION

It is an object of the invention to provide a Coriolis-type mass flow sensor which is made as insusceptible to the aforementioned external disturbances as possible by further mechanical means.

To accomplish this, the invention provides a Coriolis-type mass flow sensor which can be installed in a conduit and which during operation is traversed by a fluid to be measured, comprising:

a casing to be connected with the conduit via a fluid inlet and a fluid outlet;

a rigid support base disposed within the casing,
    said support base being connected with the casing via at least one mechanical damping element;

a measuring tube traversed by the fluid and ending in the fluid inlet and the fluid outlet,
    a portion of said measuring tube to be vibrated being fixed to the support base by an inlet-side fixing means and an outlet-side fixing means, and
    an inlet-side connecting portion of said measuring tube extending from the inlet-side fixing means to the fluid inlet, and an outlet-side connecting portion extending from the outlet-side fixing means to the fluid outlet;

a vibrator arrangement for vibrating the tube portion, said vibrator assembly acting between the casing and the support base;

a first sensing element mounted near the inlet-side fixing means, partly on the tube portion, for sensing the vibrations of the tube portion; and a second sensing element mounted near the outlet-side fixing means, partly on the tube portion, for sensing the vibrations of the tube portion.

According to a first preferred embodiment of the invention the portion of the measuring tube to be vibrated has the form of the arc of a circle. In addition thereto, each connecting portion of the measuring tube is bent preferably with a smaller radius of curvature as that of the portion of the measuring tube to be vibrated.

According to a second preferred embodiment of the invention the measuring tube has a nominal diameter of less than 10 millimeters, in particular a nominal diameter of about 1 millimeter.

According to a third preferred embodiment of the invention the mass of the support is large compared to the mass of the portion of the measuring tube to be vibrated.

According to a fourth preferred embodiment of the invention a first sensor portion fixed to the portion of the measuring tube to be vibrated and a second sensor portion fixed to the portion of the measuring tube to be vibrated have a small mass compared to that of the portion of the measuring tube to be vibrated.

An essential advantage of the invention is that no component of a vibrator assembly need be fixed to the measuring tube, so that at the point where the measuring tube is excited, the tube have no mass in addition to their own mass. The smaller the nominal bore of the measuring tube, the more apparent this advantage will be. This is particularly important in the case of nominal diameters around 1 millimeter.

A further advantage of the invention is that, according to its problem solution which can be interpreted as an inner vibration compensation, substantially no vibration portions are transferred from the measuring tube vibrating at an momentary frequency to the conduit.

BRIEF DESCRIPTION OF THE DRAWINGS

The invention will now be explained in more detail with reference to the accompanying drawing, in which an embodiment of the invention is shown approximately to scale, and in which like parts are designated by like reference characters.

FIG. 2 is a top view of the mass flow sensor of FIG. 1 after removal of an upper part of the casing.

DETAILED DESCRIPTION OF THE DRAWINGS

Figure 1:
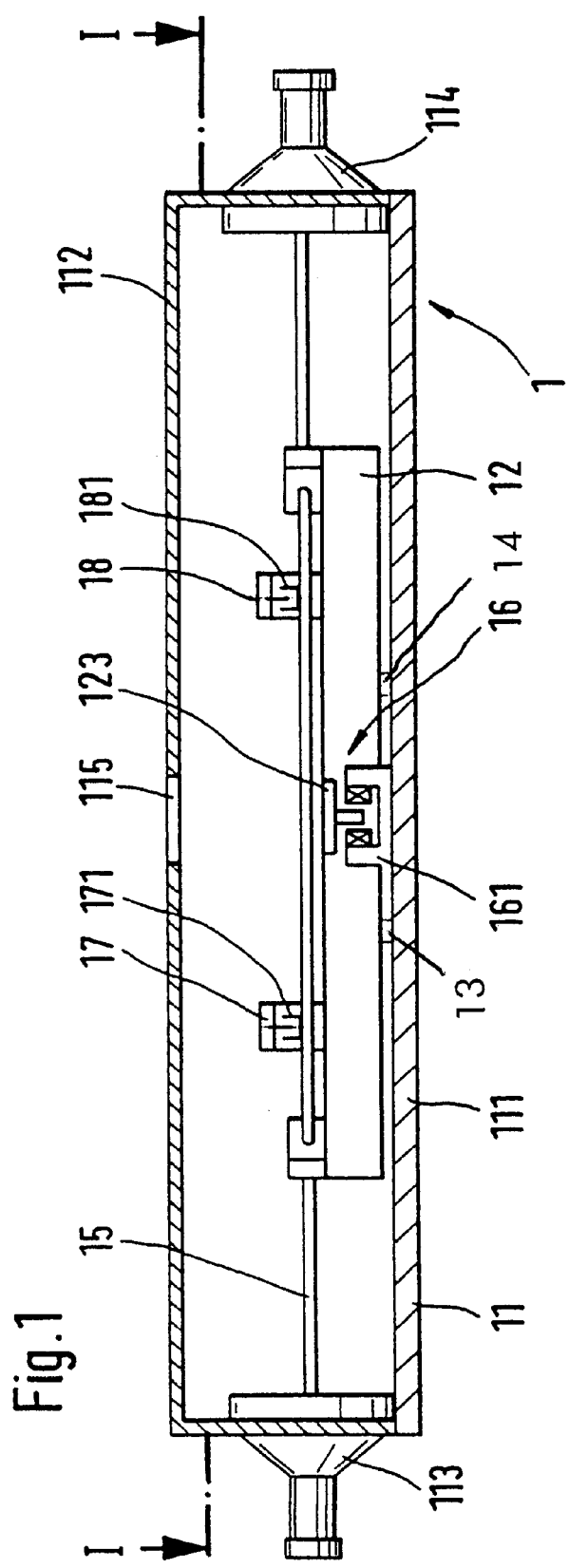
FIG. 1 is a longitudinal section of a mass flow sensor.

A Coriolis-type mass flow sensor 1 shown in FIG. 1 in a longitudinal section taken along line II—II of FIG. 2 and in FIG. 2 in a top view along line I—I of FIG. 1, which can be installed, e.g., by means of flanges, threaded connections or clamping devices, in a conduit (not shown), is traversed in operation by a fluid to be measured and has a casing 11, in which its essential parts are housed to protect them from environmental influences.

As can be seen from the figures, the Coriolis-type mass flow sensor of the embodiment can be installed in the conduit (not shown) in such a way as to be axially aligned with the latter.

The casing 11, as indicated in FIGS. 1 and 2, may be composed of several parts, namely a lower part in the form of, e.g., a bottom plate 111, an upper part 112, a fluid inlet 113, and a fluid outlet 114. In the finished condition of the Coriolis-type mass flow sensor, these parts are permanently joined together.

To be able to bring electric leads into and out of the casing, the upper part 112 has an opening 115 in which a suitable bushing can be tightly fitted.

Mounted within the casing 11 is a support base 12 which, in this embodiment, has the form of a rectangular thick plate. The mass of the support base 12 is preferably large compared to the mass of the tube portion 151. The support base 12 is connected with the casing 11, in this embodiment with the bottom plate 111, via damping elements 13, 14, 20; the damping elements 13, 14 or the damping element 20 may also be dispensed with.

Thus, the support base 12 is not rigidly mounted on the casing 11 but is only so attached to the latter that, although it is still movable relative to the casing 11 in all directions, movements, particularly impacts or vibrations originating from the casing, will be transmitted to the support base 12 only in highly damped form, if at all; the support base 12 is therefore spaced a given distance from the bottom plate 111.

A single measuring tube 15 extends parallel to a top side of the support base 12. It is bent in a plane parallel to that top side and is traversed by the fluid. The measuring tube 15 ends in the fluid inlet 113 and the fluid outlet 114.

In the area of the support base 12, the measuring tube 15 has a portion 151 which preferably has the form of an arc of a circle, and which is vibrated in a direction perpendicular to the plane in which the measuring tube 15 is bent, the vibrations being produced by a vibrator assembly 16, e.g., an electromagnetic vibrator, particularly an electrodynamic vibrator. The tube portion 151 is fixed to the support base 12 at opposite edges of the latter by fixing means 121, 122.

Unlike the prior-art arrangements, where the vibrator assembly is located either between the support base and the measuring tube or between the measuring tubes themselves and thus acts directly on the measuring tube or tubes, in the invention, the tube portion 151 is vibrated indirectly as the vibrator assembly 16 acts between the casing 11 and the support base 12. Since the support base 12 is mounted on the casing 11 via the damping elements 13, 14, 20 so as to be capable of vibratory motion relative to the casing, the vibrations of the support base 12 are transmitted to the tube portion 151.

In the embodiment of FIGS. 1 and 2, the vibrator assembly 16 is located beside the support base 12. In order to permit the aforementioned action on the support base 12 to take place, the latter is provided with a lateral projection 123 between which and the casing 11 the vibrator assembly 16 is located. The projection 123 is thinner than the support base 12. A longitudinal axis of symmetry of the projection 123 coincides with a transverse axis of symmetry of the support base 12.

The vibrator assembly 16 comprises a bobbin 161, a coil, and a permanent magnet which is attached to the projection 123 and extends into the coil. The bobbin 161 is fastened to the bottom plate 111 of the casing 11. Any of the conventional vibrator circuits can be used to produce the vibrations, which are the useful vibrations of the tube portion 151 and, thus, the measuring tube 15.

A connecting portion 152 of the measuring tube extends from the fixing means 121 to the fluid inlet 113. The connecting portion 152 provides a kink-free transition between the direction of the end of the tube portion 151 emerging from the fixing means 121 and the direction of the conduit. The latter direction is the direction in which one end of the measuring tube 15 must extend when entering the fluid inlet 113.

In analogous, but mirror-symmetrical fashion, a connecting portion 153 of the measuring tube extends from the fixing means 122 to the fluid outlet 114. The connection portion 153 provides a kink-free transition between the direction of the end of the tube portion 151 emerging from the fixing means 122 and the direction of the conduit. The latter direction is the direction in which the other end of the measuring tube 15 must extend when entering the fluid outlet 114.

After leaving the fixing means 121, the connecting portion 152 of the measuring tube first follows the curvature of the tube portion 151 and then takes an oppositely directed turn with a smaller radius of curvature than that of the tube portion 151. After another reversal of the direction of curvature, the connecting portion 152 ends in the fluid inlet 113.

Analogously, the connecting portion 153 of the measuring tube, after leaving the fixing means 122, first follows the curvature of the tube portion 151 and then takes an oppositely directed turn with a smaller radius of curvature than that of the tube portion 151. After another reversal of the direction of curvature, the connecting portion 153 ends in the fluid inlet 114.

The tube portion 151 and the connecting portions 152, 153 form the measuring tube 15, which has the desired nominal diameter and is a seamless tube. The measuring tube 15 can be bent from straight tube lengths in a suitable bending machine.

A first sensing element 17 and a second sensing element 18 which are mounted partly on the tube portion 151, are disposed near the fixing means 121 and 122, respectively, for sensing the vibrations of the tube portion 151. Mass flow rate can be determined in the conventional manner by determining the phase or time difference of the signals provided by the sensing elements 17, 18. The sensing elements 17, 18 are, for example, electromagnetic sensors, particularly electrodynamic ones.

Particularly with the above-mentioned nominal diameter of the tube portion 151 around 1 millimeter, a part 171 of the sensing element 17 connected with the tube portion 151 and a part 181 of the sensing element 18 connected with the tube portion 151 will have a mass which is small compared to the mass of the tube portion 151.

The application of the principle underlying the invention, i.e., the principle of the above-mentioned indirect excitation of the measuring tube, is not limited to the embodiment shown, but this principle can be used to advantage wherever an internal, resiliently mounted support base is present in the casing with respect to which the measuring tube is vibrated. This support base must then be vibrated relative to the casing.

What is claimed is:

1. A Coriolis-type mass flow sensor which can be installed in a conduit and which during operation is traversed by a fluid to be measured, comprising:
   a casing to be connected with the conduit via a fluid inlet and a fluid outlet;
   a rigid support base disposed within the casing,
      said support base being connected with the casing via at least one mechanical damping element;
   a measuring tube traversed by the fluid and ending in the fluid inlet and the fluid outlet,
      a portion of said measuring tube to be vibrated being fixed to the support base by an inlet-side fixing means and an outlet-side fixing means, and
      an inlet-side connecting portion of said measuring tube extending from the inlet-side fixing means to the fluid inlet, and an outlet-side connecting portion extending from the outlet-side fixing means to the fluid outlet;
   a vibrator assembly attached to the casing and the support base, said vibrator assembly operable to drive the support base in respect to the casing in order to indirectly vibrate the tube portion that is fixed to the support base when said vibrator assembly is acting between the casing and the support base;
   a first sensing element mounted near the inlet-side fixing means, partly on the tube portion, for sensing the vibrations of the tube portion; and
   a second sensing element mounted near the outlet-side fixing means, partly on the tube portion, for sensing the vibrations of the tube portion,
wherein the measuring tube has a nominal diameter of less than 10 millimeters, and wherein the support base her comprises a projection to which said vibrator assembly is attached.

2. A Coriolis-type mass flow sensor according to claim 1, wherein the portion of the measuring tube to be vibrated has the form of the arc of a circle.

3. A Coriolis-type mass flow sensor according to claim 2, wherein each connecting portion of the measuring tube is bent with a smaller radius of curvature as that of the portion of the measuring tube to be vibrated.

4. A Coriolis-type mass flow sensor according to claim 3, wherein the measuring tube has a nominal diameter of less than 10 millimeters.

5. A Coriolis-type mass flow sensor according to claim 2, wherein the measuring tube has a nominal diameter of less than 10 millimeters.

6. A Coriolis-type mass flow sensor according to claim 1, wherein the mass of the support is large compared to the mass of the portion of the measuring tube to be vibrated.

7. A Coriolis-type mass flow sensor according to claim 1, wherein a first sensor portion fixed to the portion of the measuring tube to be vibrated and a second sensor portion fixed to the portion of the measuring tube to be vibrated have a small mass compared to that of the portion of the measuring tube to be vibrated.

8. A Coriolis-type mass flow sensor according to claim 1, wherein the measuring tube has a nominal diameter of about 1 millimeter.

9. A Coriolis-type mass flow sensor according to claim 1, wherein the tube portion extends parallel to a top side of the support base and is bent in a plane parallel to the top side, and said vibrator assembly is attached to a bottom side of the support base in order to directly drive the bottom side of the support base in respect to the casing when said vibrator assembly is acting between the support base and the casing.

10. A Coriolis-type mass flow sensor according to claim 1, wherein the support base comprises a rectangular plate having a traverse axis of symmetry, and a projection to which said vibrator assembly is attached, said projection having a longitudinal axis of symmetry that coincides with the traverse axis of symmetry of the rectangular plate.

11. A Coriolis-type mass flow sensor according to claim 10, wherein said vibrator assembly comprises a bobbin and coil that is fastened to the casing and a magnet that is attached to the projection and extends into the coil.

12. A Coriolis-type mass flow sensor which can be installed in a conduit and which during operation is traversed by a fluid to be measured, comprising:
   a casing to be connected with said conduit via a fluid inlet and a fluid outlet;
   a rigid support base disposed within said casing and connected with said casing via at least one mechanical damping element, said support base comprising
      a rectangular plate having a traverse axis of symmetry, and
      a projection having a longitudinal axis of symmetry that coincides with the traverse axis of symmetry of said rectangular plate;
   a measuring tube traversed by said fluid and ending in said fluid inlet and said fluid outlet,
      a tube portion having an inlet side fixed near a first edge of said rectangular plate and outlet side fixed near a second edge of said rectangular plate that is opposite to said first edge, and
      an inlet-side connecting portion of said measuring tube extending from said inlet side of said tube potion, and an outlet-side connecting portion extending from said outlet side of said tube portion to said fluid outlet;
   a vibrator assembly attached to said casing and said projection of said support base, said vibrator assembly operable to drive said projection of said support base in respect to the casing in order to indirectly vibrate said tube portion that is fixed to said support base when said vibrator assembly is acting between said casing and said support base;

a first sensing element for sensing vibrations of said tube portion, said first sensing element mounted near said inlet-side of said tube portion; and a second sensing element for sensing vibrations of said tube portion, said second sensing element mounted near said outlet-side of said tube portion.

13. A Coriolis-type mass flow sensor according to claim 12, wherein the measuring tube has a nominal diameter of less than 10 millimeters.

14. A Coriolis-type mass flow sensor according to claim 12, wherein the measuring tube has a nominal diameter of about 1 millimeter.

15. A Coriolis-type mass flow sensor according to claim 12, wherein said tube portion extends parallel to a top side of said support base and is bent in a plane parallel to said top side, and said vibrator assembly is attached to a bottom side of said support base in order to directly drive said bottom side of said support base in respect to the casing when said vibrator assembly is acting between said support base and said casing.

16. A Coriolis-type mass flow sensor according to claim 12, wherein said support base comprises a rectangular plate having a traverse axis of symmetry, and a projection to which said vibrator assembly is attached, said projection having a longitudinal axis of symmetry that coincides with said traverse axis of symmetry of said rectangular plate.

17. A Coriolis-type mass flow sensor according to claim 12, wherein said vibrator assembly comprises a bobbin and coil that is fastened to said casing and a magnet that is attached to said projection and extends into said coil.

18. A Coriolis-type mass flow sensor according to claim 12, wherein the mass of said support base is large compared to the mass of said tube portion to be vibrated.

* * * * *